(12) United States Patent
Tanaka et al.

(10) Patent No.: US 6,321,063 B1
(45) Date of Patent: Nov. 20, 2001

(54) DOCUMENT CONVEYANCE DEVICE HAVING DROP-PREVENTION MECHANISM, AND IMAGE REPRODUCING APPARATUS EQUIPPED THEREWITH

(75) Inventors: Yoshihisa Tanaka; Hiroaki Shiba, both of Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 09/580,496

(22) Filed: May 30, 2000

(30) Foreign Application Priority Data

May 31, 1999 (JP) .................................................. 11-152584

(51) Int. Cl.[7] .................................................. G03G 15/00
(52) U.S. Cl. .......................................... 399/367; 399/369
(58) Field of Search .................................. 399/367, 369; 355/75

(56) References Cited

U.S. PATENT DOCUMENTS

| 4,183,519 | * | 1/1980 | Harris | 271/245 |
| 4,444,494 | * | 4/1984 | Koyama et al. | 355/75 |
| 4,629,315 | * | 12/1986 | Bruggers | 355/75 |

FOREIGN PATENT DOCUMENTS 63-118148-A * 5/1988 (JP) .

* cited by examiner

Primary Examiner—Quana M. Grainger
(74) Attorney, Agent, or Firm—Shinjyu Global IP Counselors, LLP (57) ABSTRACT

A drop-prevention mechanism for keeping original document sheets from falling off a document loading table openable on the upper surface of a multifunctional printer having, for example, faxing and photocopying capabilities. A loading section on the loading table loads documents for feeding to an automatic document feeder (ADF) that positions documents onto a rear image-reading part of the upper surface of the multifunctional printer. A discharge section of the loading table beneath the loading section receives documents discharged from the rear image-reading part by the ADF. The loading table is openable to expose a front image-reading part of the upper surface of the printer, where odd-sized documents, books and the like may be manually positioned for photocopying. When the loading table is swung up to expose the front image-reading section, the drop-prevention mechanism pivots catches (drop-prevention members) into position where the near edges of documents left stacked on the loading section abut on the catches, which prevents the documents on the loading table from falling off. When the loading table is swung down and closed onto the printer upper surface, (into the ADF operational position), the drop-prevention mechanism is stowed out of the way, so as not to interfere with the sheet-discharging operation of the ADF.

16 Claims, 6 Drawing Sheets

Fig.7

DOCUMENT CONVEYANCE DEVICE HAVING DROP-PREVENTION MECHANISM, AND IMAGE REPRODUCING APPARATUS EQUIPPED THEREWITH

BACKGROUND OF THE INVENTION

TECHNICAL FIELD

The present invention relates to sheet conveyance devices, and in particular, to a sheet conveyance device in an automated document handler mounted on the upper part of an image reproducing apparatus. More specifically, in an image reproducing apparatus equipped with an openable document loading table, the invention concerns a drop-prevention mechanism for preventing documents or copy material sheets from dropping off the apparatus when the loading table is opened.

DESCRIPTION OF RELATED ART

Figure 7:
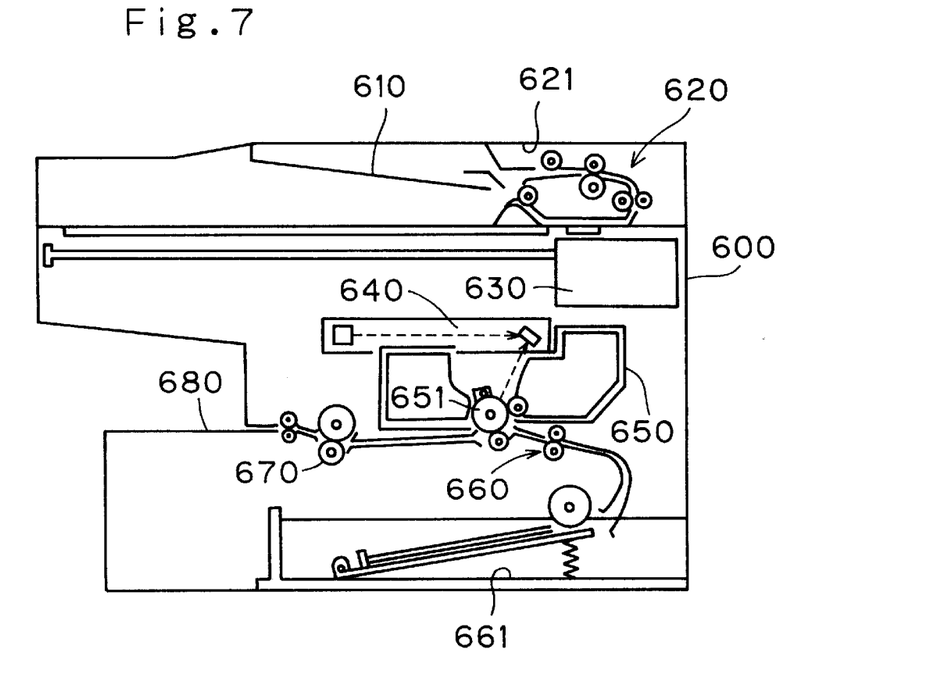
FIG. 7 is an image reproducing apparatus equipped with a sheet conveyance device of conventional art.

Conventional facsimile machines, photocopier machines and other image reproducing apparatuses have an automated document conveyance device (sheet conveyance device) on top of the main unit of the image reproducing apparatus. FIG. 7 shows an example of this type of image reproducing apparatus. An automated document conveyance device (hereinafter automatic document feeder, or "ADF device") is disposed on top of a main unit 600 in the apparatus of FIG. 7. The ADF device has a document loading table 610 and a conveyance mechanism 620 disposed on the right side of the loading table 610 in the figure. The main unit 600 has a scanner 630 disposed below the loading table 610; an optical unit 640 disposed below the scanner 630; and an imaging unit 650 disposed below the optical unit 640. The imaging unit 650 has a photosensitive drum 651, and on the photosensitive drum 651 a toner image is formed from the image of the document exposed by laser light output from the optical unit 640, and is transferred to a transfer sheet. The main unit 600 has a transfer sheet supply unit 660 having a sheet supply cassette 661 disposed below the imaging unit 650; a fixing unit 670 disposed on the downstream end of the transfer sheet supply unit 660; and a transfer-sheet discharge section 680 disposed on the downstream end of the fixing unit 670.

The conveyance mechanism 620 of the ADF device conveys documents loaded onto the loading table 610, one sheet at a time, toward the imaging unit 650 of the image reproducing apparatus main unit 600 using a sheet-feed roller or other sheet-feed means, and after the document image is read, returns the document onto the loading table 610.

In recent years, with the spread of personal computers, offices have become increasingly networked, and in most offices there is a main printer. Demand has been increasing for equipment that will allow more efficient use of office space and for reduction of the costs associated with office equipment. This has resulted in multifunctional printers (image reproducing devices) that have multiple functions, including facsimile and photocopier capabilities.

The ADF devices mounted on such multifunctional image reproducing devices usually include a document loading table, as well as a discharge table for reloading of a document discharged from its image reading unit. This loading table and discharge table are normally mounted through a hinge mechanism along one edge, allowing them to open/ shut in the upward direction against the image reproducing device. Thus when photocopying a thick document such as a book or other bound document, or in cases where a conveyed document causes a paper jam, operations can be performed with the ADF device in the open position.

As image reproducing apparatuses such as the above have become multifunctional, there has been demand for devices with good operability and which require still less space. Hence devices are offered wherein the discharge table for transfer sheets following image reproduction is disposed parallel to the loading table of the ADF device toward the front side of the main unit; and in order to lessen the effort needed to open and close the ADF device, that are built segregated into a section comprising the loading table and discharge table, and a section comprising a conveyance mechanism, with only the section comprising the loading table and discharge table being openable.

However, in a such conventional devices, when the ADF device is opened with a document loaded on the loading table or the discharge table, there is the problem of documents dropping from the loading table or the discharge table to the back of the image reproducing apparatus, that is, falling to the far side when seen from the operational direction.

To prevent documents thus from dropping, it is necessary to confirm in advance whether a document is loaded on the loading table or discharge table before opening the ADF device; if the document is loaded, it must first be removed before opening the ADF device. Consequently operability is poor. Furthermore, if several documents end up falling, trouble must be taken to arrange the documents after picking them up.

In order to resolve the aforementioned problems, technology such as that described in Japanese laid-open patent application 5-116804 has been proposed. Therein, when the movement of opening the upper part of the image reproducing apparatus main unit is detected, the document holding means, which is also the document feeding means, presses against the upper part of the document, preventing the document from falling.

However, in the aforementioned configuration a separate mechanism for pressing against and removal from the document is necessary—i.e., a document holding means—and a detection means for detection of the main unit opening is also necessary, thus increasing the number of parts, rendering the mechanism more complex, and increasing costs.

Furthermore, in an apparatus wherein the document loading table and discharge table are provided integrally as described above, the weight of the entire ADF device is increased, and so there is the problem that the burden on the operator is increased in opening and closing the device.

SUMMARY OF THE INVENTION

An object of the present invention is reliably to keep original documents loaded on the open/closable loading table of a document conveyance device for an image reproducing apparatus from dropping off the conveyance device/ image reproducing apparatus when the loading table is opened, meanwhile simplifying construction of such a document conveyance device over, and making it less expensive than, devices discussed in the foregoing.

Another object is wherein the loading table is closed in the document conveyance device to avoid interference with document conveyance, and to improve operating performance in opening and closing the loading table, and in preventing documents from dropping from the sheet conveyance device.

A further object of the invention is to configure an image reproducing apparatus with a sheet conveyance device meeting the above-noted objects.

The sheet conveyance device of this invention is disposed on the top part of an image reproducing apparatus main unit. Thus as a device for conveying sheets, it comprises a loading table, a conveyance mechanism, and a drop prevention mechanism. The loading table is hinge-fitted so that it can open away from the image reproducing apparatus main unit, and sheets are loaded thereon. The conveyance mechanism conveys the sheets loaded onto the loading table. The drop prevention mechanism is retracted so as not to impede the conveyance of sheets when the loading table is closed. When the loading table is opened, the drop prevention mechanism prevents sheets from falling from the loading table with the action of opening the loading table.

This device prevents the falling of sheets from on top of the loading table when the loading table is opened, so that there is no need for the user to remove sheets at the time of opening the loading table.

In this sheet conveyance device, it is preferable that the loading table be openable independently of the conveyance mechanism.

In this sheet conveyance device, it is preferable that the drop prevention mechanism have a rotary shaft, a drop-prevention mechanism, an urging member, and a regulating member. The rotary shaft is rotatably supported on the downstream conveyance direction end of the loading table. The drop-prevention mechanism is rotatable with the rotary shaft, and assumes both a first position, wherein the edges of sheets loaded on the loading table abut on it, and a second position, wherein it is out of contact with the sheet edges. The urging member urges the drop-prevention mechanism toward the first position. The regulating member positions the drop-prevention mechanism in the second position when the loading table is closed.

In this sheet conveyance device, the drop prevention mechanism may also comprise a pivot member capable of pivoting with the rotary shaft and the drop-prevention mechanism. Herein, it is preferable: that the urging member urge the drop-prevention mechanism toward the first position by urging the pivot member; that the regulating member be disposed on the top surface of the main unit of the image reproducing apparatus; and that the regulating member be an abutment piece that comes in contact with the aforementioned pivot member when the loading table is closed, to position the aforementioned drop-prevention mechanism in the aforementioned second position.

In this sheet conveyance device, it is preferable that wherein an image reading means is disposed in the upper part of the image reproducing apparatus, the abutment piece be disposed in a position away from the image reading means, and that it have a abutment portion that makes contact with the pivot member when the loading table is closed, and an sloped portion that makes contact with the pivot member and facilitates the pivoting of the pivot member that accompanies the opening and closing of the loading table.

In this sheet conveyance device, it is preferable that a stowing section be formed at the downstream conveyance direction end of the loading table, for stowing the drop-prevention mechanism in the second position.

In this sheet conveyance device, it is preferable that the conveyance mechanism have a supply mechanism and a discharge mechanism. The supply mechanism supplies sheets loaded onto the loading table to the position for reading by the image reading means of the image reproducing apparatus main unit. The discharge mechanism discharges onto the loading table the sheets whose images have been read by the image reading means.

The image reproducing apparatus of this invention comprises an image reproducing apparatus main unit and a document conveyance device. The image reproducing apparatus has the following internal parts: an image reading means for reading images from documents; a transfer sheet conveyance mechanism for conveying transfer sheets; and an image reproduction unit for reproducing images read by the image reading means onto conveyed transfer sheets. The document conveyance device is disposed on the top part of the image reproducing apparatus main unit, and comprises a loading table, a conveyance mechanism, and a drop prevention mechanism. The loading table is configured to open away from the main unit of the image reproducing apparatus; documents are loaded thereon. The conveyance mechanism conveys documents loaded onto the loading table. The drop prevention mechanism retracts so as not to impede the conveyance of documents when the loading table is closed; when the loading table is opened, the drop prevention mechanism prevents documents from falling from the loading table when the loading table is opened.

In this image reproducing apparatus, it is preferable that the loading table be openable independently of the conveyance mechanism.

Moreover, in this image reproducing apparatus, it is preferable that the drop prevention mechanism have a rotary shaft, a drop-prevention mechanism, an urging member, and a regulating member. The rotary shaft is rotatably supported at the downstream conveyance direction end of the loading table. The drop-prevention mechanism can rotate with the rotary shaft; and can assume both a first position, wherein the edges of documents loaded on the loading table abut upon it, and a second position, wherein it brought out of contact with the document edges. The urging member urges the drop-prevention mechanism toward the first position. The regulating member positions the drop-prevention mechanism in the second position when the loading table is closed.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

An embodiment of this invention will be explained, with reference to the attached drawings.

Figure 1:
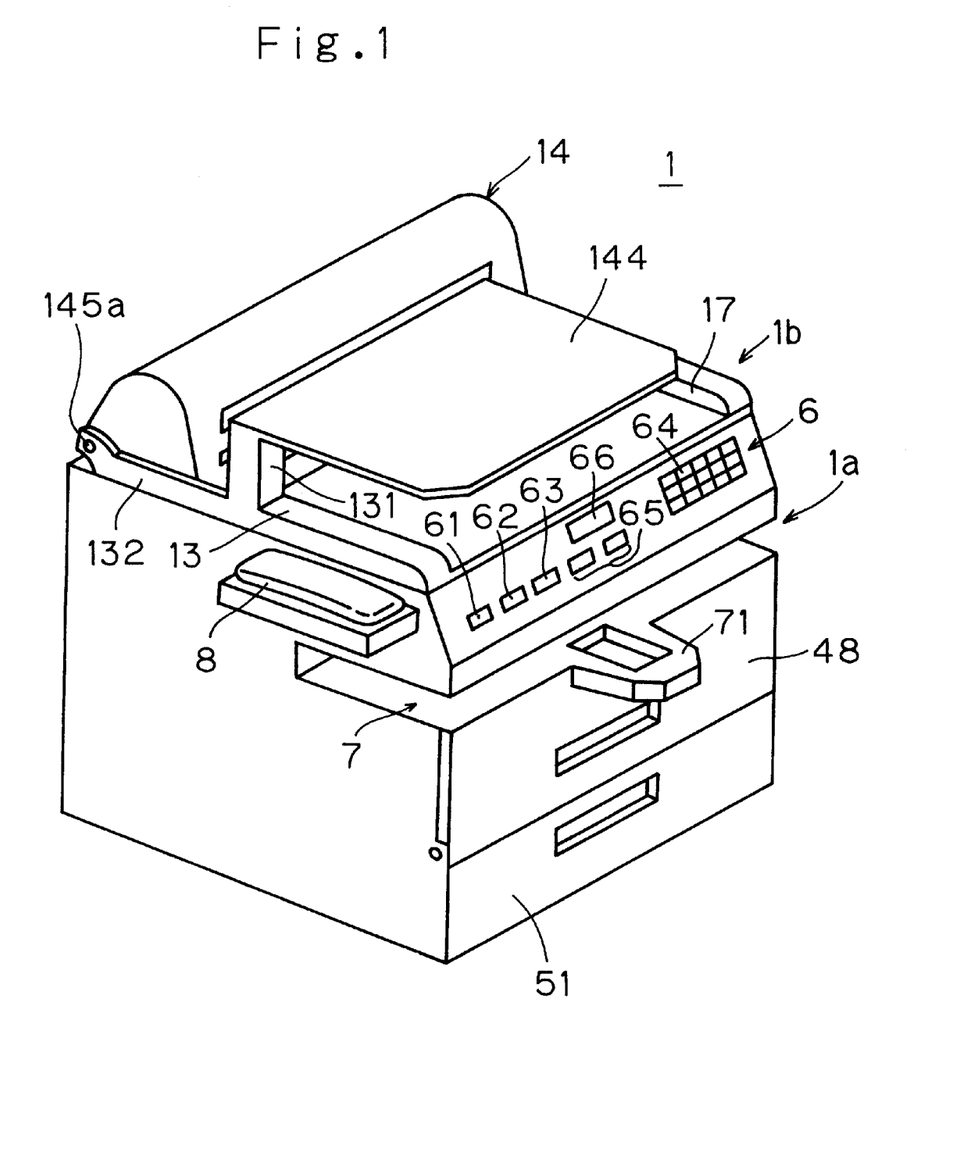
FIG. 1 is an overall oblique view of an image reproducing apparatus having a drop-prevention mechanism of one embodiment of this application, and a sheet conveyance device wherein the drop-prevention mechanism is adopted.
Figure 2:
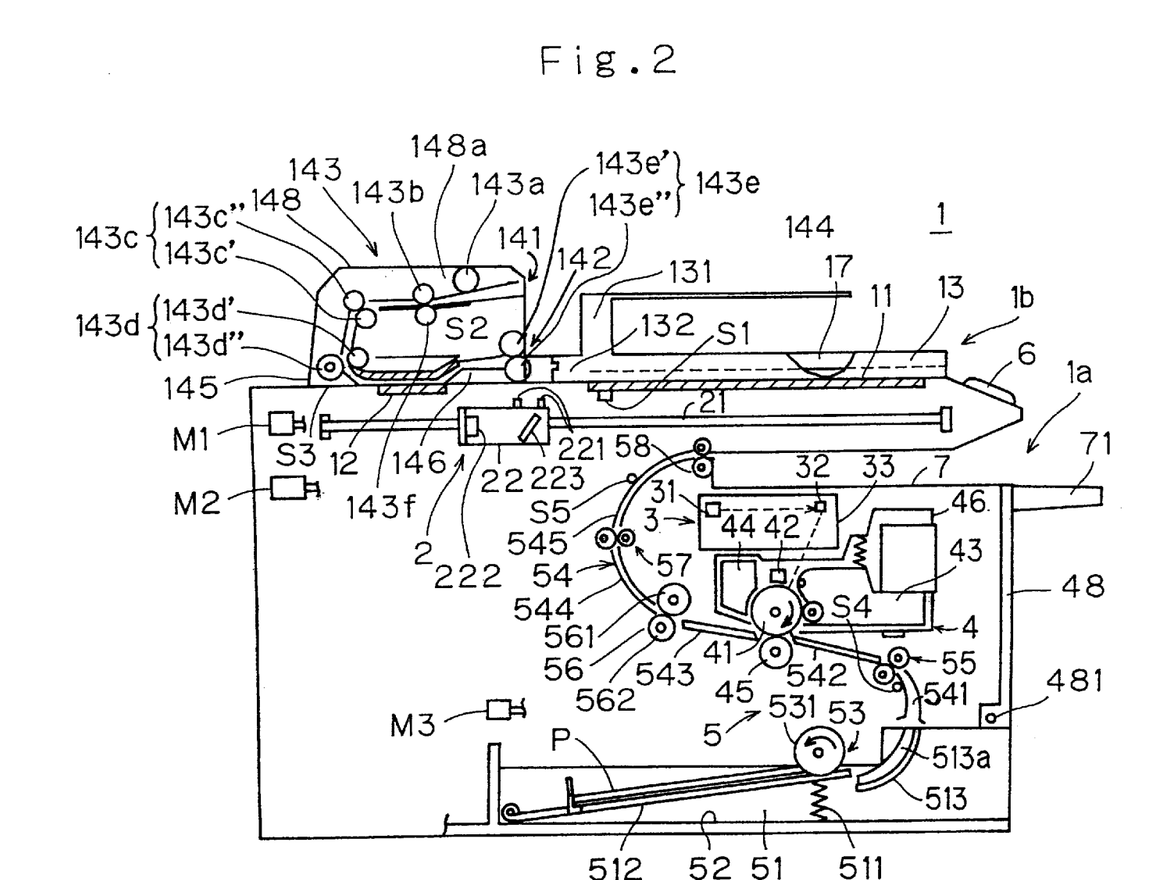
FIG. 2 is a schematic sectional view of internal components of an image reproducing apparatus having the sheet conveyance device shown in FIG. 1.

FIG. 1 is an overall oblique view of an image reproducing apparatus having as an ADF device, a sheet conveyance device embodying one aspect of this invention. The image reproducing apparatus shown here is a hybrid machine combining photocopier functions and facsimile functions. FIG. 2 is a cross-sectional structural diagram of the image reproducing apparatus shown in FIG. 1.

In these figures, an image reproducing apparatus 1 has a main unit 1a and an ADF device 1b disposed on the top of the main unit 1a.

The main unit 1a comprises an image reading means 2, an optical unit 3, an image reproduction unit 4 including photosensitive drum 41, and a transfer sheet conveyance mechanism 5. An operation panel 6 is provided on the front side of the upper outside surface of the main unit 1a (the right side in FIG. 2). On the top part of the main unit 1a a transfer-sheet discharge section 7 is formed extending from the front to an intermediate point depth-ward into the main unit 1a. A telephone set 8 is disposed on one side of the main unit 1a for the transmission and reception of images of documents to and from outside facsimile machines. Because this image reproducing apparatus 1 will usually perform tasks such as photocopying and sending and receiving facsimile transmissions on the side of the main unit 1a where the operation panel 6 is disposed, the side where the operation panel 6 is disposed is called the front side, and the side opposite the side on which the operation panel 6 is disposed is called the back side.

A first contact glass plate 11 is disposed on the uppermost part of the main unit 1a. Also on the uppermost part of the main unit 1a, further toward the back than the first contact glass plate 11, a second contact glass plate 12 is disposed. The first contact glass plate 11 is disposed in the stationary document reading area, the stationary document reading area being an area for reading the image of a document by scanning using a scanner 22, described below, and comprising a means 2 for reading images from stationary documents. When a document is loaded onto the first contact glass plate 11, the document is detected by a document detection sensor S1, and a detection signal is output. The second contact glass plate 12 is disposed in the moving document reading area. The moving document reading area is an area in which a document image is read by moving the document across the stationary scanner 22.

The ADF device 1b has a document loading table 13 and a conveyance mechanism 14 for conveying documents. The loading table 13 is disposed above the first contact glass plate 11, and covers the first contact glass surface in an openable manner. The drop prevention mechanism of this invention is used on this loading table 13. The conveyance mechanism 14 is provided above the second contact glass plate 12. A concavity is formed in the upper surface of the loading table 13; this concavity serves as a discharge section 17 to receive a document discharged from the conveyance mechanism 14.

The conveyance mechanism 14 comprises a document insertion port 141, which opens on the front side; a document discharge port 142; and a document conveyance unit 143. The document discharge port 142, like the document insertion port 141, opens on the front side of the apparatus; in addition, it is disposed below the document insertion port 141, and above the discharge section 17. The document conveyance unit 143 takes in a document inserted into the document insertion port 141, directing it rearward, and then reverses the conveyance direction at an intermediate position, conveying the document to the document discharge port 142 on the front side. In front of the document insertion port 141 is a document-loading section 144.

The document-loading section 144 is arranged over the loading table 13, and upward projecting supports 131 are mounted unitarily to, as a pair in opposing positions on the rear end of, the loading table 13 (in the depth direction of the sheet surface of FIG. 2). Arranged in the document conveyance unit 143 are, in order going upstream to downstream in the conveyance direction: a forward-feed roller 143a; a sheet feed roller 143b; a first conveyance roller pair 143c (roller 143c', roller 143c''); a second conveyance roller pair 143d (roller 143d', roller 143d''); and a discharge roller pair (a third conveyance roller pair) 143e (roller 143e', roller 143e''). Also provided is a plying roller 143f that is urged toward the sheet feed roller 143b.

The first conveyance roller pair 143c, second conveyance roller pair 143d, and discharge roller pair 143e each comprise a driving roller and a driven roller. The driving rollers of the forward-feed roller 143a, sheet feed roller 143b, and the first conveyance roller pair 143c, the driving roller of the second conveyance roller pair 143d, and the driving roller of the discharge roller pair 143e all rotate in a direction so as to convey documents in the downstream direction by means of the driving force of a motor M1. The plying roller 143f comprises a torque limiter; when a single document sheet passes between the sheet feed roller 143b and the plying roller 143f, the torque applied to the plying roller 143f is large, causing it to move in accordance with the sheet feed roller 143b; when multiple document sheets pass between the sheet feed roller 143b and the plying roller 143f, the torque applied to the plying roller 143f is small, causing the torque limiter to be activated, preventing rotation. As a result, because the friction force between document sheets is smaller than the friction force between document sheets and the plying roller 143f, only the uppermost document sheet is conveyed downstream by the sheet feed roller 143b.

The document conveyance unit 143 is provided with document detection sensors S2, disposed upstream of and in the vicinity of sheet feed roller 143b, and S3, disposed downstream of and in the vicinity of the second conveyance roller pair 143d. When a document, its pages stacked with the image reproduction side up, is loaded into the document-loading section 144 and inserted up to the upstream vicinity of the sheet feed roller 143b, the document detection sensor S2 detects the presence of the document, and in response to a subsequently issued instruction signal the driving motor M1 is driven and the document is conveyed downstream, one sheet at a time. When the leading edge of the conveyed document reaches a position in the downstream vicinity of the second conveyance roller pair 143d, this is detected by the document detection sensor S3, and as a result of the detection signal, control is exercised such that when the leading edge of the document reaches the second contact glass plate 12, reading of the image is begun by the scanner 22, described below. Thereafter, control is exercised such that when the trailing edge of the document finishes passing the second contact glass plate 12, reading of the image by the scanner 22 is ended. A document that has been read is conveyed to the document discharge port 142 by the discharge roller pair 143e. While the document detection sensor S2 is turned on, document sheets loaded into the document-loading section 144 are conveyed downstream in succession.

When a document sheet passes through the second conveyance roller pair 143d, the front and back sides are reversed, and when the position of the second contact glass plate 12 is reached, the image reproduction side is facing the second contact glass plate 12, enabling image reading there-from. Document sheets which have been conveyed to the document discharge port 142 are discharged into the discharge section 17, and are stacked up in succession, with the image reproduction side down. As a result, when the document is recovered from the discharge section 17, the document sheets are stacked in the same order as before copying.

Figure 3:
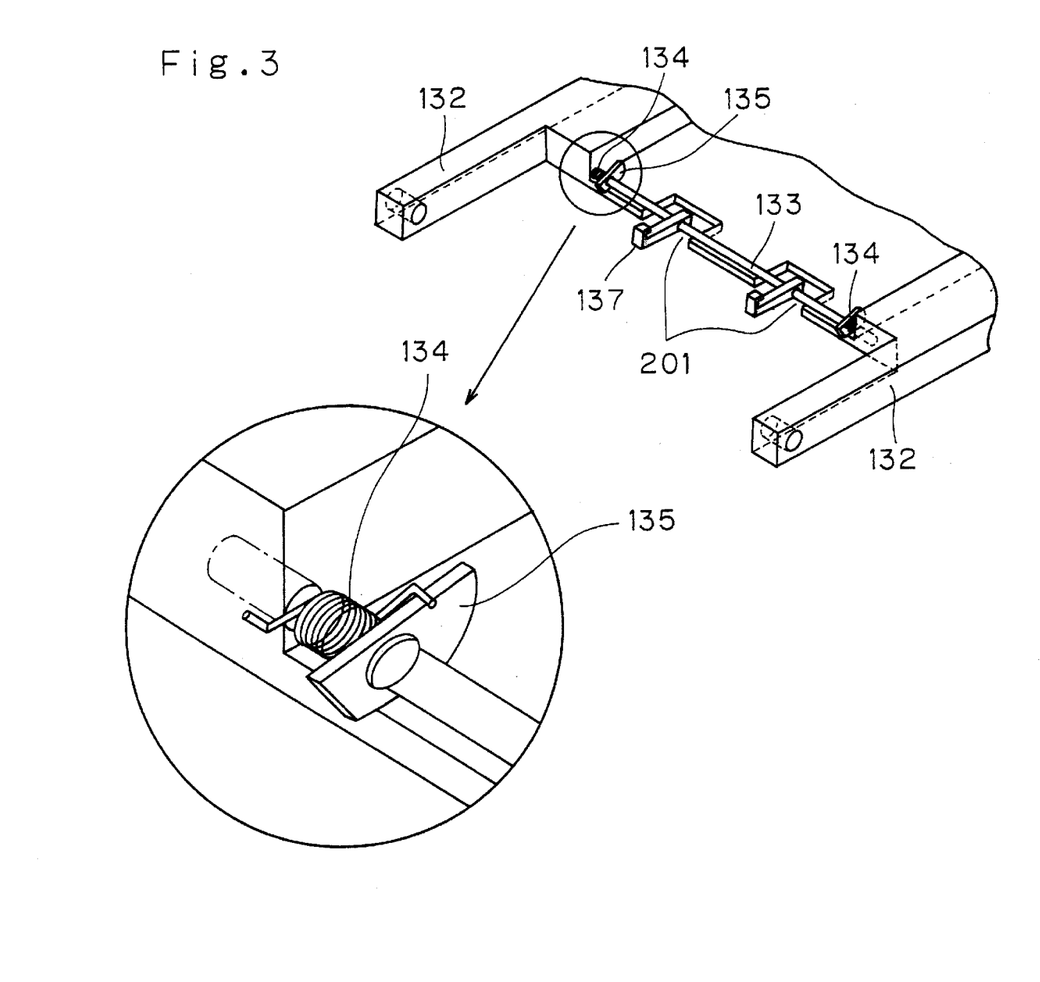
FIG. 3 is an oblique view of chief components of the drop prevention mechanism construction according to the invention.
Figure 5:
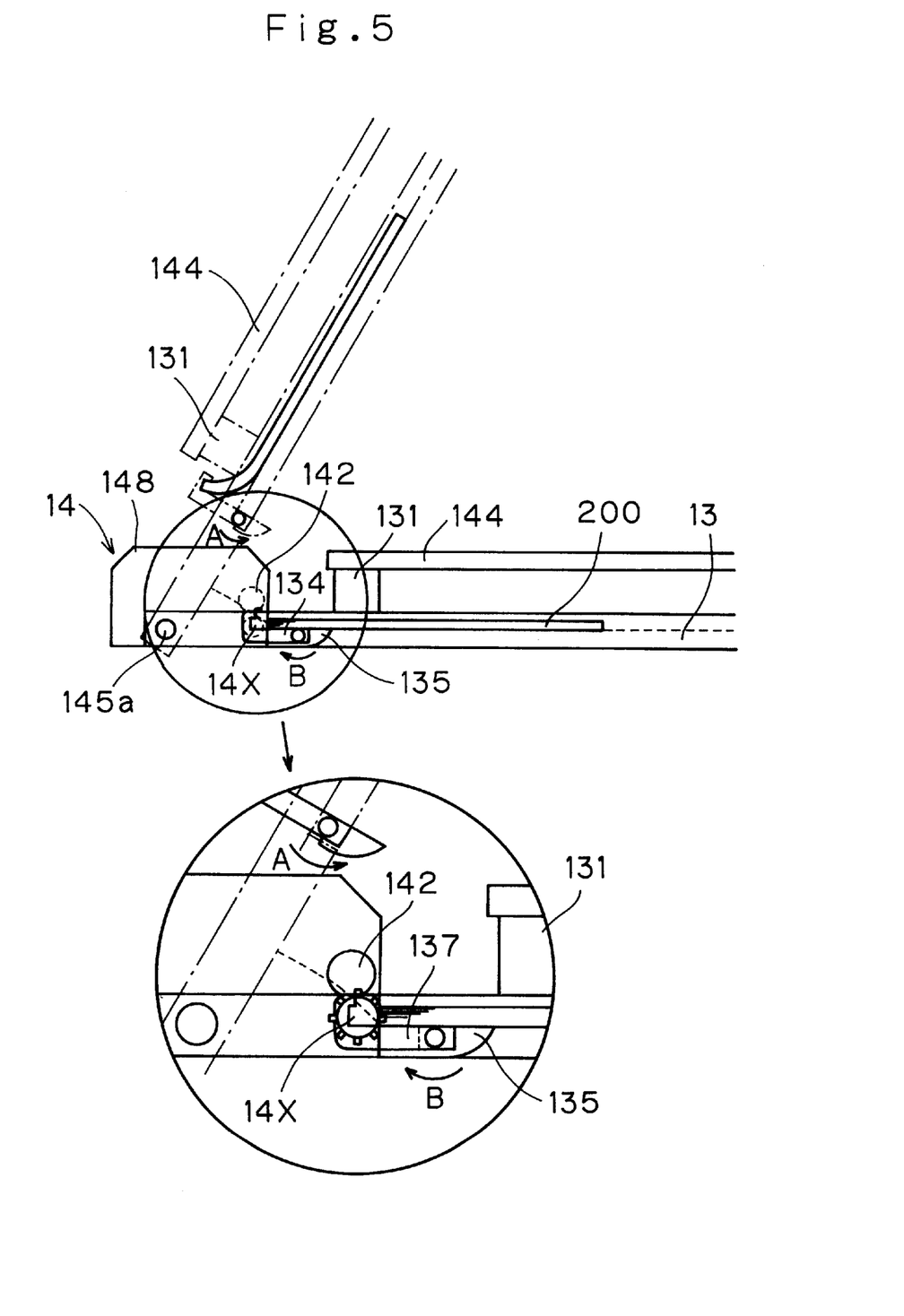
FIG. 5 is a side view showing action of opening/closing the sheet loading table in the sheet conveyance device indicated in FIG. 1.
Figure 6:
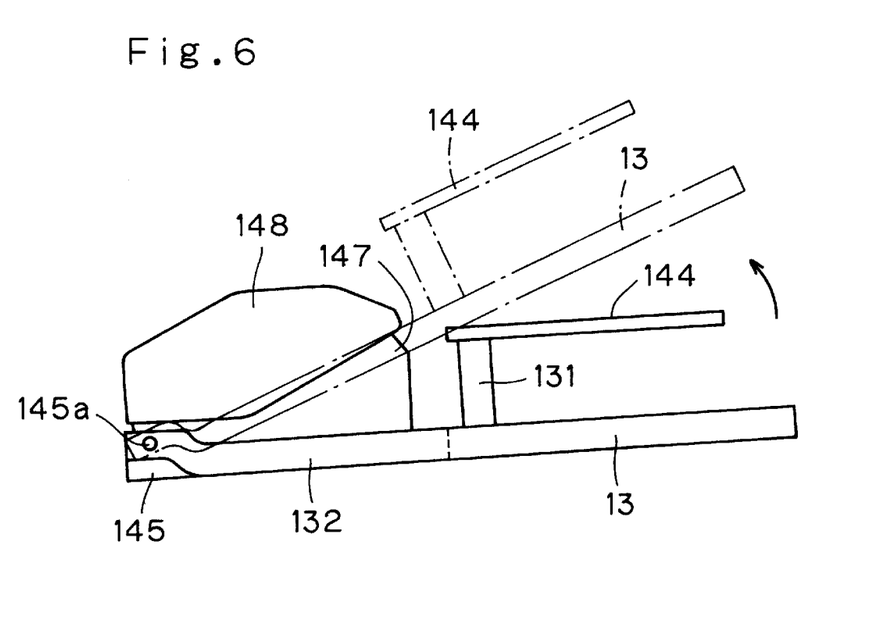
FIG. 6 is a side view showing pivoting of the drop prevention mechanism of this invention.

The loading table 13 has a pair of arms 132 at opposing positions towards the back (the depth direction in the figure) and extending toward the back, as shown in FIG. 3. An upstream-side guide 145 having a shaft 145a protruding horizontally is formed in a position toward the main unit 1a, as shown in FIGS. 1 and 2, and the pair of arms 132 is supported by the shaft 145a of the upstream guide 145 in a manner such that the tips of the arms are pivotable. Thus, as the hidden lines in FIG. 5 show, when the front side of the loading table 13 is lifted up, the loading table 13 rises together with the document-loading section 144 using the shaft 145a as support, so that the document loading face of the first contact glass plate 11 is opened. When the force lifting the loading table 13 is removed, the loading table 13 falls under its own weight, supported by the shaft 145a, and the document loading surface of the first contact glass plate 11 is covered.

As shown in FIGS. 1 and 2, the image reading means 2 comprises a guide rail 21 provided along the sides of the first and second contact glass plates 11, 12, and a scanner 22 disposed in a manner allowing reciprocal motion between the front and back along the guide rail 21. The scanner 22 comprises a light source 221 employing an LED or the like for irradiating the image side of the document, a CCD or other reading unit 222, and a mirror 223 to guide the document image to the reading unit 222. Usually the scanner stands by at the home position, midway between the first contact glass plate 11 and the second contact glass plate 12.

When a document is loaded onto the first contact glass plate 11, its presence is detected by the document detection sensor S1, and the driving motor M2 is driven in response to a subsequently supplied instruction signal. By this means the scanner 22 moves from the home position to the leading edge of the document toward the operation panel 6. Next, the light source 221 is illuminated, and the scanner 22 moves from the front side, which is the position of the leading edge of the document, toward the back, to scan the document image, reading an image for each line. After subjecting the read image data to predetermined data. processing, the results are converted into digital signals and stored in memory (not shown in the figures). When reading of document images is finished, the light source 221 is extinguished and the scanner returns to the home position.

When a document is loaded into the document-loading section 144, the document is detected by the document detection sensor S2, and subsequently the driving motor M2 is driven in response to an instruction signal it is given, causing the scanner 22 to move from the home position to the position of the second contact glass plate 12. When the document is conveyed by the conveyance mechanism 14 and passes over the second contact glass plate 12, the scanner 22 reads the document image one line at a time. This read image data is, as in the process described above, stored in memory (not shown in the figures). The light source 221 is illuminated prior to reading of the document image, and is extinguished after reading. When conveyance of all document sheets loaded into the document-loading section 144 has ended, the scanner 22 returns to the home position. In this way, at the second contact glass plate 12 position, the scanner 22 reads the document images in a stationary state, and so the time required for moving the scanner such as when in operation at the first contact glass plate 11 can be eliminated, and the amount of an image read per unit time can be increased.

The optical unit 3 is provided below the transfer-sheet discharge section 7; it exposes, on the surface of the photosensitive drum 41, document images retrieved from memory which have been read by the scanner 22, as well as images retrieved from memory which have been transmitted from another facsimile machine. The optical unit 3 comprises an emission unit 31 which converts into laser light for output a modulation signal generated on the basis of the image data, and a reflecting mirror 32 to reflect the laser light from the emission unit 31, directing it toward the photosensitive drum 41. The constituent members of the optical unit 3 are unitarily mounted within a housing 33; this housing 33 is provided within the main unit 1a fixed into place on the frame of the main unit 1a by screws or other means.

The image reproduction unit 4 comprises, along the perimeter of the photosensitive drum 41, a charging device 42 in the upper part, a developer unit 43 in front of the charging device, and a cleaning unit 44 in back of the charging device 42. The photosensitive drum 41 is rotated in the direction of the arrow by the driving force of the driving motor M3; a static charge region is formed on its peripheral surface when opposite the charging device. In this static charge region a latent electrostatic image is formed by the laser light output from the optical unit 3, and when opposite the developer unit 43, this latent electrostatic image is developed into a toner image. Below the photosensitive drum 41 is provided a transfer roller 45; the toner image on the photosensitive drum 41 is transferred to a transfer sheet when opposite the transfer roller 45. The toner remaining on the peripheral surface of the photosensitive drum 41 is removed when opposite the cleaning unit 44 downstream in the rotation direction.

The constituent members of the image reproduction unit 4 are mounted within a housing 46, in a unitary structure therewith; this housing 46 is detachably fitted within the main unit 1a on the main unit frame (not shown). A cover 48 is provided on the front of the image reproduction unit 4 of the main unit 1a; the cover 48 can be opened frontward, supported by a shaft 481 on the lower end of the main unit 1a. By this means, the cover 48 can be opened, and the image reproduction unit 4 can be withdrawn to the exterior of the main unit 1a.

The transfer sheet conveyance mechanism 5 is formed in the bottom part of the main unit 1a. It comprises a sheet supply cassette loading unit 52, a paper supply unit 53, and a transfer-sheet conveyance path 54. This transfer sheet conveyance mechanism 5 also comprises a registration roller pair 55 provided along the transfer-sheet conveyance path 54; a fixing unit 56; a conveyance roller pair 57; and a discharge roller pair 58. The sheet supply cassette loading unit 52 is loaded with a sheet supply cassette 51, holding stacked transfer paper P. The paper supply unit 53 has a sheet supply roller 531; this sheet supply roller 531 feeds from the front the transfer paper P in the sheet supply cassette 51 loaded into the sheet supply cassette loading unit 52. The transfer-sheet conveyance path 54 guides transfer sheet drawn out from the sheet supply cassette 51 to the transfer-sheet discharge section 7 via the photosensitive drum 41.

The sheet supply cassette 51 has an internal transfer sheet loading table 512 wherein the lower back end provides support for pivoting and the front end is urged upward by a spring 511. The sheet supply cassette 51 also has an internal guide 513 which guides transfer sheet drawn out by the sheet supply roller 531 to the transfer-sheet conveyance path 54. This sheet supply cassette 51 is slid from the front of the main unit 1 to fit in the sheet supply cassette loading unit 52. The sheet supply cassette 51 can be drawn outside the main unit 1a by pulling forward when replenishing transfer paper or when a jam has occurred near the sheet supply roller 531. The guide 513 guides transfer sheets upward to the transfer-sheet conveyance path 54, and so is formed in a bowed shape, concave upward, near the transfer sheet loading table 512. On the side of the guide 513 that makes contact with transfer sheets, a plurality of ribs 513a are provided at a predetermined interval along the conveyance direction; by this means the transfer sheets can be conveyed smoothly.

In addition to the sheet supply roller 531, the paper supply unit 53 has a plying claw, plying roller, or other plying means (not shown) to prevent feeding of multiple pages of transfer sheets. The sheet supply roller 531 is disposed on the top part of the sheet supply cassette 52 in a position toward the front, and is rotated in the direction of the arrow by the driving force of the driving motor M3 via a clutch (not shown) to convey transfer sheets to the registration roller pair 55.

The transfer-sheet conveyance path 54 comprises a first pre-transfer guide 541 and a second pre-transfer guide 542 which turn toward the back the transfer sheets drawn out from the front of the sheet supply cassette 51 and feed them between the photosensitive drum 41 and transfer roller 45; a post-transfer guide 543 which feeds a transfer sheet onto which an image has been transferred by the photosensitive drum 41 to the fixing unit 56 toward the rear; and a first reversing guide 544 and second reversing guide 545 which reverse the conveyance direction of a transfer sheet after it passes through the fixing unit 56, and discharge it to the transfer-sheet discharge section 7 toward the front. Each of the guides 541, 542, 543, 544, 545 is formed from (synthetic polymer) resin or the like, and is provided with a plurality of ribs 513a spaced at predetermined intervals along the conveyance direction on the side ming contact with the transfer sheet; by this means transfer sheet can be efficiently conveyed.

The registration roller pair 55 is provided between the first pre-transfer guide 541 and the second pre-transfer guide 542, and is driven by the driving force of the driving motor M3 via a clutch (not shown). Transfer sheets are fed between the photosensitive drum 41 and the transfer roller 45 in synchronization with the formation of a latent electrostatic image on the photosensitive drum 41 by the optical unit 3. When feeding of one sheet of transfer sheet is completed, the clutch is released and driving is stopped. Immediately before this registration roller pair 55 a transfer sheet sensor S4 is provided; a predetermined time after the leading edge of the transfer sheet is detected, the driving of the sheet supply roller 531 is stopped.

The fixing unit 56 comprises a heating roller 561, disposed above, and a pressure roller 562, disposed below; it is provided between the post-transfer guide 543 and the first reversing guide 544. The heating roller 561 has an internal heater, and the pressure roller 562 presses against the heating roller 561 with a predetermined spring force. The toner image on a transfer sheet conveyed between these rollers is fixed, and the transfer sheet, with fixed toner image, is conveyed toward the first reversing guide 544. The conveyance roller pair 57 is disposed between the first reversing guide 544 and the second reversing guide 545, and the discharge roller pair 58 is disposed at the very end of the second reversing guide 545. A transfer sheet sensor S5 is disposed at an approximately midway position in the conveyance direction of the second reversing guide 545, for detecting irregularities in the conveyance of transfer sheet.

The operation panel 6 is provided with a start switch 61, a mode selection key 62 to select between a photocopier mode and a facsimile transmission mode, an enlargement/reduction key 63, a numeric keypad 64, and other function keys 65 provided to enable the user to set various other functions, in addition to a display unit 66 enabling the user to visually confirm function settings.

The operation of an image reproducing apparatus configured as described above will be explained. The mode selection key 62 of the operation panel 6 is used to select photocopier mode or facsimile transmission mode. Then a document is loaded into the document-loading section 144, this is detected by a document detection sensor. When the start switch 61 of the operation panel 6 is turned on, the document is conveyed by the conveyance mechanism 14 onto the second contact glass plate 12. The document image is read by the scanner 22, which has moved from the home position to the second contact glass plate 12 position, and the document image that has been read is stored in memory. A document that has been read is discharged to the discharge section 17. When the document for photocopying or for facsimile transmission is a book or other bound document, the document is loaded directly onto the first contact glass plate 11. This is then detected by the document detection sensor S1. When the start switch 61 is turned on, the image side of the document is scanned by the scanner 22 and the image is read. The read image is stored in memory. When an image is transmitted via a telephone line from an outside facsimile machine, the signal is detected, reception mode is set automatically, and the received image data is stored in memory.

When in facsimile transmission mode, the image data stored in memory is read and is transmitted to the other facsimile machine via telephone lines. When in photocopier mode or in facsimile reception mode, the image stored in memory is transferred to transfer sheet(s), which are discharged to the transfer-sheet discharge section 7.

In other words, when in photocopier mode or facsimile reception mode, the photosensitive drum 41 is charged by the charging device 42, and laser light corresponding to the image data stored in memory is emitted to expose the photosensitive drum 41, thereby forming a latent electrostatic image. Then, toner supplied to the photosensitive drum 41 from the developer unit 43 adheres to the latent electrostatic image to form a toner image.

Meanwhile, a transfer sheet stored in the sheet supply cassette 51 is fed toward the registration roller pair 55 by the sheet supply roller 531 via the first pre-transfer guide 541. In synchronization with the formation of the latent electrostatic image, this transfer sheet is conveyed to the gap between the photosensitive drum 41 and the transfer roller 45 by the registration roller pair 55 via the second pre-transfer guide 542. Next the toner image of the photosensitive drum 41 is transferred to the transfer sheet by the transfer roller 45, to which has been applied a voltage of polarity opposite the polarity of the latent electrostatic image. Following this, the transfer sheet is separated from the photosensitive drum 41, and is conveyed to the fixing unit 56 via the post-transfer guide 543. This fixing unit 56 fixes the toner image on the transfer sheet. The transfer sheet with fixed toner image is then discharged to the transfer-sheet discharge section 7 by the conveyance roller pair 57 and discharge roller pair 58, via the first reversing guide 544 and the second reversing guide 545.

Figure 4:
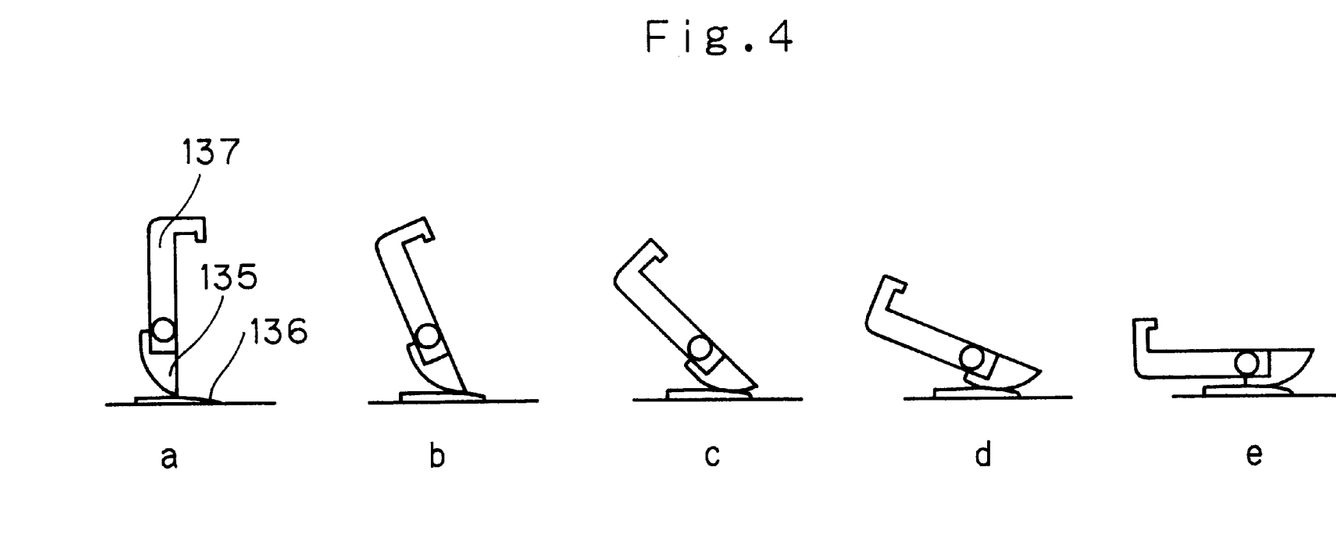
FIG. 4 shows sequential views a–e of an isolated portion of the drop-prevention mechanism illustrating operation thereof.

Next one example of a specific configuration of the drop prevention mechanism will be explained. FIGS. 3, 4 and 5 show a specific example of a drop prevention mechanism; FIGS. 4a through 4e show the actions of the drop prevention mechanism over time, accompanying the opening of the ADF device.

The drop prevention mechanism comprises a rotary shaft 133, a pair of abutting members (pivot members) 135 fixed at both ends of the rotary shaft 135, springs 134 (urging means) which urge each of the abutting members 135 in the direction of the arrow B (referring to FIG. 5), and drop prevention members 137.

The rotary shaft 133 passes through the loading table 133, wherein it is rotatably supported. The abutting members 135 are provided on a frame unit, shown in FIG. 3 and FIG. 5, on the upper surface of the image reproducing apparatus main unit, and abut on at least one abutment 136. As shown in FIG. 4, the abutting members 135 are formed such that the lowermost part, which makes contact with the abutment 136, describes a gentle arc shape. They pivot from the state in FIG. 4e to the state in FIG. 4a when the ADF device 1b is swung from the horizontal position to the upward opened position.

Specifically, the abutment 136 comprises a flat part, the upper face of which is parallel to the upper face of the image reproducing apparatus main unit, and a sloped part which inclines gently downward. When the ADF device 1b is closed on the upper surface of the apparatus main unit 1a, the abutment 136, the abutting members 135 and the drop prevention members 137 of the drop prevention mechanism are in the positional relation shown in FIG. 4e. It is preferable that the drop prevention member 137 be configured such that it is inside a recessed stowage 201 provided in the loading table 13 so as not to impede document conveyance, and that it is stowed within the conveyance mechanism 14 (FIGS. 3, 5) provided on the end toward the connection with the loading table 13. Hence the drop prevention member 137 is hidden by the lower roller 14X when in this document-transfer horizontal position, and the document is discharged by the rollers 14Z, 14X. When the loading table 13 begins to pivot upward, the abutting members 135 gradually and smoothly are made to pivot in the direction of the arrow B in FIG. 5 by the urging force of the spring 134, while maintaining a state of contact with the inclined part of the upper face of the abutment 136. By means of the pivoting of the abutting members 135, the rotary shaft 133 rotates in the direction of the arrow B; by means of the rotation of the rotary shaft 133, the drop prevention member 137, which is fixed to the same shaft, also pivots in the direction of the arrow B.

The drop prevention member 137 pivots from the state of being stowed in the stowage 201 into its active position to act on the document, where it protrudes. The drop prevention members 137 are provided with a bend which makes contact with and supports the bottom end (that is, the downstream end in the conveyance direction) of documents when the loading table 13 is disposed in the opened position. Hence when the document table 13 is opened, the bend prevents documents from dropping from the end of the loading table 13.

Next, when the loading table is closed from its opened state so that it is disposed horizontally, in the opposite manner from when it was opened, the abutting members 135 and drop prevention members 137 pivot in sequence from the state shown in FIG. 4a to the state of FIG. 4e. That is, the lower part of the abutting members 135 make contact with the upper face of the abutment 136 on the main unit side of the apparatus, pivoting in opposition to the urging force of the. spring 134. As described above, the abutment 136 is provided with a gently inclined part in its upper face, so that the arc-shaped part provided at the bottom of the abutting members 135 smoothly pivots along the inclined face. This pivot of the abutting members 135 is accompanied by rotation of the rotary shaft 133 to which the abutting members 135 are fixed. By this means the drop prevention member 137 pivots to be stowed in the stowage 201, so that the drop prevention member 137 does not obstruct document discharge.

The shape of the abutment 136 in this embodiment consists of a flat portion and an inclined portion; however, the shape of the abutment 136 is not limited to this. The shape may be a gentle circular arc shape or a semicircular shape, as long as the pivoting of the abutting members 135 is smooth and appropriate. The abutment may also be used as a position-regulating member to maintain a gap enabling appropriate conveyance of documents between the upper face of the apparatus main unit 1a and the ADF device 1b. In addition, a rotary shaft provided with a drop-prevention mechanism may also be disposed on the side of the document-loading section 144 so as to be linked with the pivoting of the drop prevention mechanism of the loading table 13, to prevent pivoting of the loading table 13 from causing documents to drop prior to image reading.

One embodiment of this invention, an image reproducing apparatus provided with a transfer-sheet discharge section 7 to discharge transfer sheets, has been described. However, in cases where a separate transfer-sheet conveyance path is provided to enable conveyance toward the top of the apparatus, the apparatus may be configured such that detection sensors detect that the ADF device is not currently being used and that no document is stacked in the loading table 13 or in the document-loading section 144, and transfer sheets can be discharged according to user selection of the loading table 13 or the document-loading section 144. It would thus be easy to remove transfer sheets and make visual confirmation, for greater convenience.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A sheet-material conveyance device for installation on top of an image reproducing apparatus main unit, the sheet-material conveyance device comprising:

a sheet-material loading table for loading sheet-materials, furnished to take open and close positions between which the loading table moves with respect to the image reproducing apparatus main unit, the loading table having a discharge section and a drop-prevention mechanism; and a conveyance mechanism located beside the discharge section with the drop-prevention mechanism therebetween for discharging the sheet-materials into the discharge section, the drop-prevention mechanism preventing, wherein the loading table is in the open position, sheet-materials from dropping from the discharge section following from an act of opening the loading table, and avoiding, wherein the loading table is in the closed position, interference with conveyance of sheet-materials from the conveyance mechanism to the discharge section.

2. The sheet-material conveyance device set forth in claim 1, wherein the loading table is permitted to open/close independently of the conveyance mechanism.

3. The sheet-material conveyance device set forth in claim 2, wherein
the drop-prevention mechanism includes:
a rotary shaft supported in a conveyance direction downstream-ward end of the loading table to permit rotation;
a drop-prevention member able to assume a first position wherein the drop-prevention member can abut endwise on sheet-materials loaded onto the loading table, and a second position wherein the drop-prevention member does not abut endwise on the sheet-materials;
an urging member for urging the drop-prevention member toward the first position; and
a regulator for positioning, wherein the loading table is in the closed position, the drop-prevention member in the second position.

4. The sheet-material conveyance device set forth in claim 3, wherein:
the drop-prevention mechanism further comprises a pivot member pivotable together with the rotary shaft and the drop-prevention member;
the urging member urges the drop-prevention member toward the first position by urging the pivot member; and
the regulator is provided on an upper surface of the image reproducing main unit, and wherein the loading table is in the closed position, the regulator being an abutment component on which the pivot member abuts for positioning the drop-prevention member into the second position.

5. The sheet-material conveyance device set forth in claim 4, wherein
the image reproducing apparatus main unit includes image-reading means provided in a top portion of the image reproducing apparatus main unit; and
the abutment component is provided in a position apart from the image-reading means, and has an abutment portion for abutment with the pivot member wherein the loading table is in the closed position, and a sloped portion for abutment with the pivot member along with an act of opening/closing the loading table, for smoothing pivoting action of the pivot member.

6. The sheet-material conveyance device set forth in claim 5, wherein the conveyance mechanism includes:
a supply mechanism for supplying, into a position corresponding to the image-reading means in the image reproducing apparatus main unit, sheet materials loaded on the document loading table; and
a discharge mechanism for discharging onto the document loading table sheet materials from which images have been read by the image-reading means.

7. The sheet-material conveyance device set forth in claim 3, wherein
a stowing section is formed on the conveyance direction downstream-ward end of the loading table for stowing the drop-prevention member in the second position.

8. The sheet-material conveyance device set forth in claim 1, wherein
the loading table rotates relative to the image reproducing apparatus main unit when the loading table moves between the open and close positions.

9. The sheet-material conveyance device set forth in claim 1, wherein
the drop-prevention mechanism prevents sheet-materials from dropping from the discharge section by preventing the movement of the sheet-materials in a direction that is opposite a direction of conveyance of the sheet-materials from the conveyance mechanism to the discharge section.

10. An image reproducing apparatus comprising:
an image reproducing apparatus main unit internally including image-reading means for reading images from documents, a transfer-sheet conveyance mechanism for conveying transfer sheets, and an image forming unit for forming, onto transfer sheets conveyed thereto, images read by the image-reading means; and
a document conveyance device provided on top of the image reproducing apparatus main unit; wherein the document conveyance device comprises
a document loading table for loading documents, furnished to take open and close positions between which the document loading table moves with respect to the image reproducing apparatus main unit, the document loading table having a discharge section and a drop-prevention mechanism; and
a conveyance mechanism located beside the discharge section with the drop-prevention mechanism therebetween for discharging the documents into the discharge section,
the drop-prevention mechanism preventing, wherein the loading table is in the open position, documents from dropping from the discharge section following from an act of opening the loading table, and avoiding, wherein the loading table is in the closed position, interference with conveyance of documents from the conveyance mechanism to the discharge section.

11. The image reproducing apparatus set forth in claim 10, wherein the loading table is permitted to open/close independently of the conveyance mechanism.

12. The image reproducing apparatus set forth in claim 9, wherein the drop-prevention mechanism includes:
a rotary shaft supported in a conveyance direction downstream-ward end of the loading table to permit rotation;
a drop-prevention member able to assume a first position wherein it can abut endwise on documents loaded onto the loading table, and a second position wherein it does not abut endwise on the documents;
an urging member for urging the drop-prevention member toward the first position; and
a regulator for positioning, wherein the loading table is in the closed position, the drop-prevention member in the second position.

13. The image reproducing apparatus set forth in claim 10, wherein
the loading table rotates relative to the image reproducing apparatus main unit when the loading table moves between the open and close positions.

14. The image reproducing apparatus set forth in claim 10, wherein
the drop-prevention mechanism prevents documents from dropping from the discharge section by preventing the movement of the documents in a direction that is opposite a direction of conveyance of the documents from the conveyance mechanism to the discharge section.

15. A sheet-material conveyance device for installation on top of an image reproducing apparatus main unit, the sheet-material conveyance device comprising:

a sheet-material loading table for loading sheet-materials, furnished to permit opening/closing with respect to the image reproducing apparatus main unit;

a conveyance mechanism for conveying sheet-materials loaded on the loading table; and a drop-prevention mechanism for preventing, wherein the loading table is opened, sheet-materials from dropping from the loading table following from an act of opening the loading table, and for avoiding, wherein the loading table is closed, interference with conveyance of the sheet-materials, wherein:

the loading table is permitted to open/close independently of the conveyance mechanism;

the drop-prevention mechanism includes a rotary shaft supported in a conveyance direction downstream-ward end of the loading table to permit rotation, a drop-prevention member able to assume a first position wherein the drop-prevention member can abut endwise on sheet-materials loaded onto the loading table, and a second position wherein the drop-prevention member does not abut endwise on the sheet-materials, an urging member for urging the drop-prevention member toward the first position, a regulator for positioning, wherein the loading table is closed, the drop-prevention member in the second position, and a pivot member pivotable together with the rotary shaft and the drop-prevention member, the urging member urges the drop-prevention member toward the first position by urging the pivot member;

the regulator is provided on an upper surface of the image reproducing main unit, wherein the loading table is closed, the regulator being an abutment component on which the pivot member abuts for positioning the drop-prevention member into the second position;

the image reproducing apparatus main unit includes image-reading means provided in a top portion of the image reproducing apparatus main unit; and the abutment component is provided in a position apart from the image-reading means, and has an abutment portion for abutment with the pivot member wherein the loading table is closed, and a sloped portion for abutment with the pivot member along with an act of opening/closing the loading table, for smoothing pivoting action of the pivot member.

16. The sheet-material conveyance device set forth in claim 15, wherein the conveyance mechanism includes:

a supply mechanism for supplying, into a position corresponding to the image-reading means in the image reproducing main unit, sheet-materials loaded on the loading table; and a discharge mechanism for discharging onto the loading table sheet-materials from which images have been read by the image-reading means.

* * * * *